July 19, 1932.　　　　J. W. PAGE　　　　1,868,247
TOOTH POINT CONSTRUCTION
Filed July 3, 1931
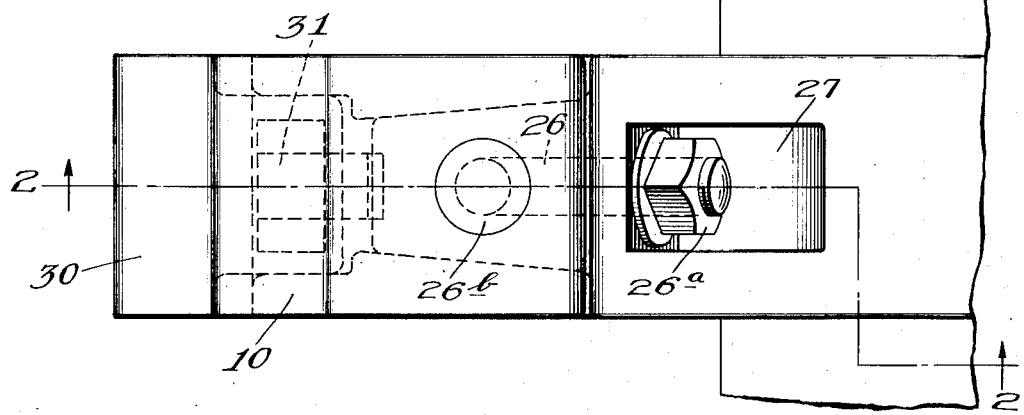
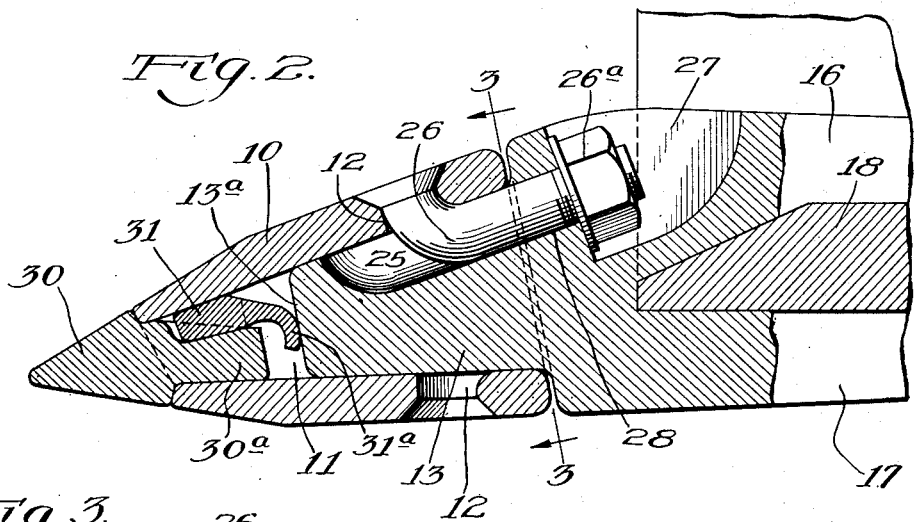
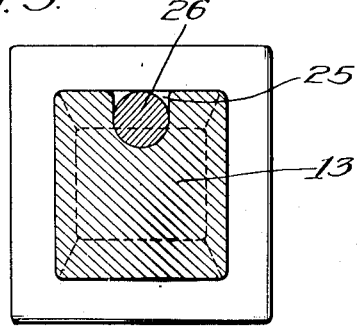
Inventor:
John W. Page.
By Dyrenforth, Lee, Chritton & Wiles
Attys.

Patented July 19, 1932

1,868,247

UNITED STATES PATENT OFFICE

JOHN W. PAGE, OF CHICAGO, ILLINOIS

TOOTH POINT CONSTRUCTION

Application filed July 3, 1931. Serial No. 548,669.

This invention relates to improvements in tooth point construction and more especially such construction adapted for excavating shovels. My invention is adapted, for example, for use in connection with excavating shovels, buckets, dredges and other excavating devices. The construction here shown is applicable for use in connection with teeth commonly used on the forward or cutting edge of excavating shovels and similar devices of the character referred to.

Among the features of my invention is a provision of tooth point construction having a detachable tip. By means of this construction, the tip may easily be removed for renewal, replacement, repair or other purposes.

Other features and advantages of my invention will appear more fully as I proceed with my specification.

In that form of device embodying the features of my invention shown in the accompanying drawing—

Fig. 1 is a top plan view; Fig. 2 is a view taken as indicated by the line 2 of Fig. 1; and Fig. 3 is a view taken as indicated by the line 3 of Fig. 2.

As shown in the drawing, 18 may indicate the bottom of the shovel carrying at its forward edge the tooth supporting stubs or lugs 13. These lugs may be mounted in any suitable manner. For example, as here shown, each lug may be attached to the bottom of the shovel 18 by means of the upper and lower parallel arms 16 and 17, respectively.

10 indicates a detachable tooth point which is wedge-shaped and provided with a square tapered socket 11. The upper face and the lower face of the tooth point are each provided with a round countersunk opening 12 extending through to the socket 11. The tooth point 10 is symmetrical so that either side having a hole 12 may be uppermost.

The recess or socket 11 in the tooth point 10 is adapted to receive the tooth supporting lug 13 which is squared and tapered and shaped to fit the recess 11 so that when the tooth point is drawn up on the lug it will engage the four sides thereof. The lug 13 is short enough to permit the tooth point to be drawn up until the lug becomes firmly seated in the socket 11.

Any suitable means may be provided for attaching the tooth point 10 to the lug 13. For example, as here shown, the upper surface of the lug 13 is provided with a groove 25 adapted to accommodate a bolt 26. A short distance above the upper end of the groove 25, the lug 13 is considerably enlarged and provided with a recess 27 adapted to accommodate the nut 26ᵃ of the bolt 26. A circular hole 28 forms a continuation of the groove 25 into the recess 27. The bolt 26 is provided with a countersunk head 26ᵇ adapted to seat in one of the countersunk openings 12 in the tooth point 10.

When the parts are in position shown in Fig. 2, it is obvious that tightening of the nut 26ᵃ will draw the tooth point 10 tightly up to the lug 13.

The tapered recess 11 in the tooth point 10 is open at the forward end. 30 indicates a detachable tip adapted to be mounted on the end of the tooth point to form virtually a continuation thereof. This mounting is accomplished in the following manner:

The detachable tip 30 is provided with a wedge-shaped part or extension 30ᵃ adapted to be inserted in the tapered recess 11 in the tooth point 10. 31 indicates a wedge-shaped member with a spring tail 31ᵃ lying beside the extension 30ᵃ on the tip inside of the recess 11. When the tooth point 10 is drawn on to the lug 13, the spring tail 31ᵃ is adapted to be engaged by the end 13ᵃ on the lug 13. Such engagement forces the wedge-shaped member 31 tightly between the upper wall of the tooth point 10 and the extension 30ᵃ on the tip, thus holding the tip firmly in position. The tail 31ᵃ being made of spring material is permitted to bend over sufficiently to permit the tooth point 10 to be drawn completely in place without breakage of the parts.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. In combination with a tooth-supporting lug and a detachable tooth point mounted thereon, a detachable tip carried by the tooth point and held in position by a wedge having a part engaged by the lug when the point is mounted thereon.

2. In combination with a tooth-supporting lug having detachably mounted thereon a tooth point with a tapered recess therein, a detachable tip having a part extending into said recess and a wedge member located in said recess adjacent said part, said wedge member being provided with a tail adapted to be engaged by the lug when the point is mounted thereon.

3. In combination with a tooth-supporting lug having detachably mounted thereon a tooth point with a tapered recess therein, a detachable tip having a part extending into said recess and a wedge member located in said recess adjacent said part, said wedge member being provided with a spring tail adapted to be engaged by the lug when the point is mounted thereon.

In witness whereof I have hereunto set my hand this 27th day of June, 1931.

JOHN W. PAGE.